US010542584B2

(12) United States Patent
Gopal et al.

(10) Patent No.: US 10,542,584 B2
(45) Date of Patent: Jan. 21, 2020

(54) ENHANCED WCI-2 MESSAGE FOR COEXISTENCE MANAGEMENT

(71) Applicant: QUALCOMM Incorporated, San Diego, CA (US)

(72) Inventors: Thawatt Gopal, San Diego, CA (US); Olaf Josef Hirsch, Sunnyvale, CA (US); Shriram Gurumoorthy, Boulder, CO (US); Reza Shahidi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/393,530

(22) Filed: Apr. 24, 2019

(65) Prior Publication Data
US 2019/0335538 A1    Oct. 31, 2019

Related U.S. Application Data

(60) Provisional application No. 62/663,993, filed on Apr. 27, 2018.

(51) Int. Cl.
*H04M 1/00* (2006.01)
*H04W 88/10* (2009.01)
(Continued)

(52) U.S. Cl.
CPC ............ *H04W 88/10* (2013.01); *H04B 1/006* (2013.01); *H04B 1/0458* (2013.01);
(Continued)

(58) Field of Classification Search
CPC ..... H04W 16/14; H04W 24/02; H04W 36/20; H04W 52/243; H04W 72/12;
(Continued)

(56) References Cited

U.S. PATENT DOCUMENTS 8,606,184 B1 * 12/2013 Luthra ................ H04B 17/318
455/41.2
9,008,064 B2 * 4/2015 Jo ........................ H04W 16/14
370/338
(Continued)

OTHER PUBLICATIONS

International Search Report and Written Opinion—PCT/US2019/029165—ISA/EPO—dated Sep. 26, 2019.

*Primary Examiner* — Quochien B Vuong
(74) *Attorney, Agent, or Firm* — Loza & Loza, LLP

(57) ABSTRACT

Systems, methods, and apparatus are described that provide for communicating coexistence messages over a multi-drop serial bus. A method performed at a device coupled to a serial bus includes receiving first coexistence information directed to a first device coupled to the serial bus, generating a first coexistence message representative of the first coexistence information, converting the first coexistence message to obtain a first datagram including the first coexistence information, and transmitting the first datagram to the first device over the serial bus. The first coexistence message may be configured for communication through a point-to-point data link. The first datagram may be configured according to a first protocol associated with the serial bus.

30 Claims, 12 Drawing Sheets

(51) Int. Cl.
*H04B 1/00* (2006.01)
*H04B 1/04* (2006.01)
*H04B 1/3805* (2015.01)
*H04W 88/06* (2009.01)

(52) U.S. Cl.
CPC .......... *H04B 1/3805* (2013.01); *H04W 88/06* (2013.01); *H04B 2001/0416* (2013.01); *H04B 2001/3811* (2013.01)

(58) Field of Classification Search
CPC ............. H04W 72/1215; H04W 76/27; H04W 84/042; H04W 84/12; H04W 88/02; H04W 88/06; H04W 88/10; H04B 1/406; H04B 7/26; H04M 11/00
USPC ................ 455/41.1, 41.2, 41.3, 552.1, 553.1
See application file for complete search history.

(56) References Cited

U.S. PATENT DOCUMENTS

| | | | |
|---|---|---|---|
| 9,301,314 B2 * | 3/2016 | Belghoul | H04W 72/1215 |
| 9,730,265 B2 * | 8/2017 | Ahn | H04B 7/26 |
| 10,039,148 B2 * | 7/2018 | Singh | H04W 76/15 |
| 10,111,106 B2 * | 10/2018 | Martin | H04W 16/14 |
| 10,375,035 B2 * | 8/2019 | Chen | H04L 9/08 |
| 2014/0364167 A1 | 12/2014 | Belghoul | |
| 2015/0103758 A1 | 4/2015 | Wang et al. | |
| 2018/0092109 A1 | 3/2018 | Belghoul et al. | |

* cited by examiner

ENHANCED WCI-2 MESSAGE FOR COEXISTENCE MANAGEMENT

PRIORITY CLAIM

This application claims priority to and the benefit of U.S. Provisional Patent Application Ser. No. 62/663,993 filed in the U.S. Patent Office on Apr. 27, 2018, the entire content of this application being incorporated herein by reference as if fully set forth below in its entirety and for all applicable purposes.

TECHNICAL FIELD

The present disclosure relates generally to coexistence management, and more particularly to repurposing low-latency WCI-2 messages for coexistence management when licensed and unlicensed frequency bands are use in a wireless access network.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bus or a parallel bus. General-purpose serial interfaces known in the industry, including the Inter-Integrated Circuit (I2C or $I^2C$) serial bus and its derivatives and alternatives, such as interfaces defined by the Mobile Industry Processor Interface (MIPI) Alliance, including the I3C interface, the system power management interface (SPMI), and the Radio Frequency Front-End (RFFE) interface.

In an SOC there can be systems in different chipsets that need to communicate with each other in real-time. One system may provide the other systems awareness of its state using coexistence messages. Coexistence messages are transmitted a multisystem platform to prevent or reduce instances of systems impinging on each other. In many instances, coexistence messages are transmitted over dedicated point-to-point links using Wireless Coexistence Interface-2 (WCI-2) messages. Conventional WCI-2 messages are limited to use in certain system configurations, and it would be desirable to improve the ability of coexistence interface to support a broader variety of radio access technologies.

SUMMARY

Certain aspects of the disclosure relate to systems, apparatus, methods and techniques that can provide optimized low-latency communications between different devices and to carry coexistence information and messages related to radio access technologies that use a combination of licensed and unlicensed frequency bands.

In various aspects of the disclosure, a method performed at a radio frequency device includes transmitting first coexistence information between two or more devices using a first type of message configured to carry one or more bits that serve as a first virtual coexistence signal related to first radio access technologies operable in a first band of frequencies, and transmitting second coexistence information between two or more radios using the first type of message by repurposing the first type of message to carry one or more bits that serve as a second virtual coexistence signal related to second radio access technologies operable in a second band of frequencies outside the first band of frequencies in which the first radio access technologies are operable. A receiver in each of the two or more radios may be coupled to a common antenna through a splitter.

In certain aspects, the method includes transmitting a second type of message indicating that the second coexistence information relates to at least one of the second radio access technologies. The first radio access technologies include Bluetooth and Wireless Local Area Network (WLAN) radio access technologies and the first radio access technologies are operable at 2.4 GHz. The second radio access technologies may include fourth generation (4G) Long-Term Evolution License Assisted Access (LTE-LAA) and WLAN-5 GHz radio access technologies and the second radio access technologies are operable at 5 GHz.

In one aspect, the first type of message is a WCI-2 Type-0 message and the second type of message is a WCI-2 Type-7 message.

In certain aspects, the second coexistence information indicates whether a transmitter of one of the two or more radios is active. The second coexistence information may relate to gain settings for a low-noise amplifier. The low-noise amplifier may be located outside one of the two or more radios. The low-noise amplifier may be a quadrature low-noise amplifier. The second coexistence information may be used to configure a quadrature low-noise amplifier.

In various aspects of the disclosure, an apparatus has a first radio configured to communicate through a shared antenna over a first network operated in accordance with WLAN-5 GHz protocols, a second radio configured to communicate through the shared antenna over a second network operated in accordance with LTE-LAA protocols using a licensed band of frequencies and an unlicensed 5 GHz band of frequencies, and a coexistence link configured to carry WCI-2 messages between the first radio and the second radio. The first radio may be configured to transmit coexistence information over the coexistence link to the second radio, using a WCI-2 Type-0 message to carry bits that serve as coexistence signals related to a WLAN-5 GHz radio access technology. The apparatus may include a splitter configured to provide signals derived from a radio frequency signal received by the common antenna to a receiver in each of the first radio and the second radio.

In various aspects of the disclosure, a processor-readable storage medium has instructions stored thereon which, when executed by at least one processor or state machine of a processing circuit, cause the processing circuit to transmit first coexistence information between two or more devices using a first type of message configured to carry one or more bits that serve as a first virtual coexistence signal related to first radio access technologies operable in a first band of frequencies and transmit second coexistence information between two or more radios using the first type of message by repurposing the first type of message to carry one or more bits that serve as a second virtual coexistence signal related to second radio access technologies operable in a second band of frequencies outside the first band of frequencies in which the first radio access technologies are operable. A receiver in each of the two or more radios is coupled to a common antenna through a splitter.

DETAILED DESCRIPTION

Figure 1:
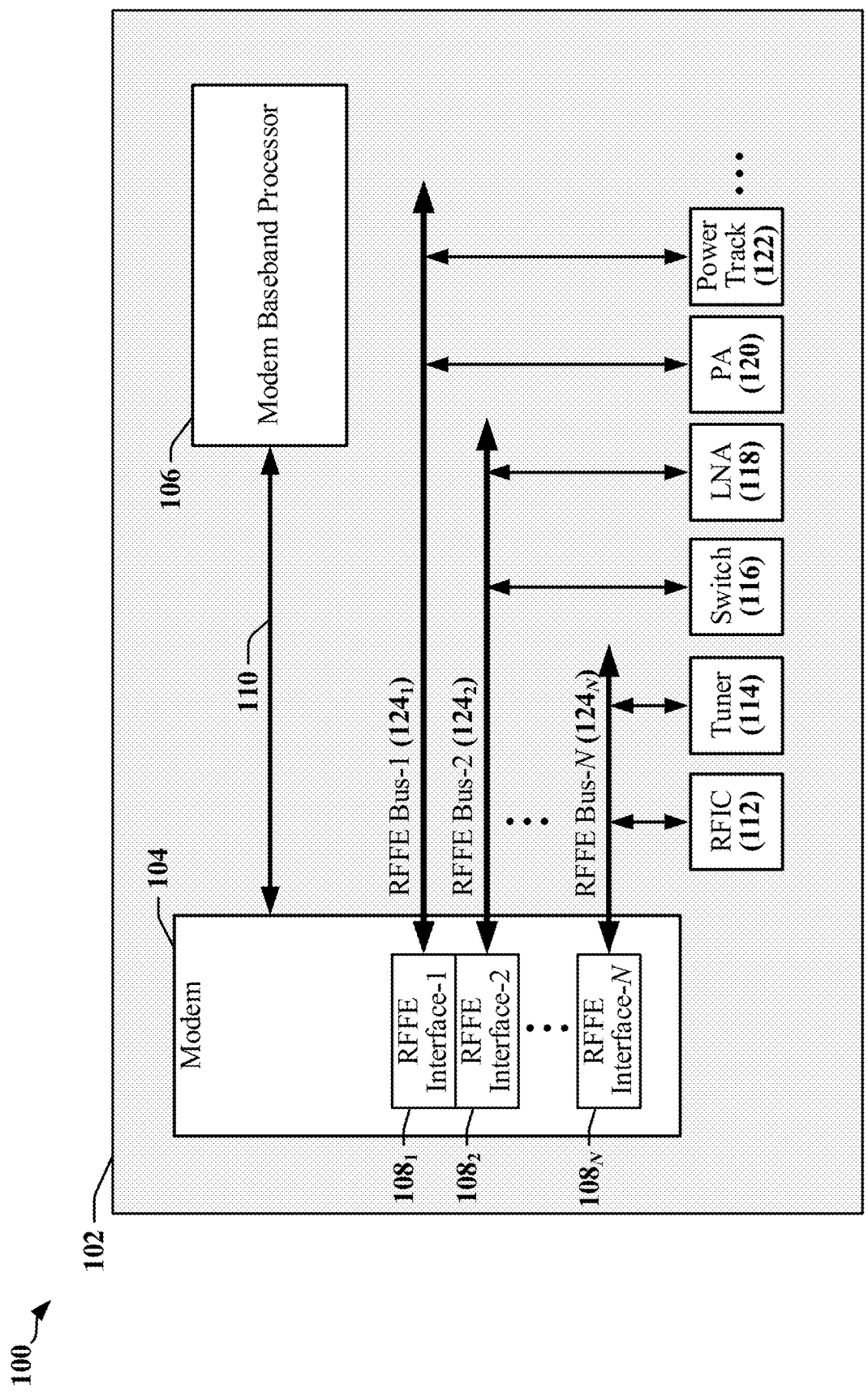
FIG. 1 illustrates a first example of a device configuration for coupling various radio frequency front-end devices using multiple RFFE buses.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple system-on-chip (SoC) and other IC devices often employ a shared communication interface that includes a serial bus or other data communication link to connect processors with modems and other peripherals. The serial bus or data communication link may be operated in accordance with multiple standards or protocols defined. In one example, a serial bus may be operated in accordance I2C, I3C, SPMI and/or RFFE protocols.

Coexistence messages may be transmitted between RF front end devices to prevent or reduce instances of concurrent transmissions that can cause interference disruption or damage to some RF devices. Latency requirements may dictate certain characteristics of a communication link and/or the protocols used to operate the communication link when coexistence messages are to be transmitted. Coexistence messages may be formatted and transmitted in accordance with the WCI-2 protocols over dedicated point-to-point links that provide low link latency. For example, coexistence messages can be sent over point-to-point data links that support low-volume, low-latency transport of byte-sized messages.

Certain aspects disclosed herein may be implemented in electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

A number of different protocol schemes may be adapted for communicating between subcomponents of an apparatus. In some instances, a multidrop serial bus may be used to carry traffic such as control messages and data related to and/or including coexistence messages. In some implementations, a multidrop serial bus may be adapted to carry coexistence messages over communication links, including I2C, I3C, RFFE, SPMI, or other standards or protocols may be used to tunnel different protocols with different register and data format requirements, different data transmission volumes and/or different transmission schedules.

Sources of Coexistence Issues

FIG. 1 illustrates a system 100 that includes a configuration of communication links in a chipset or device 102 that employs multiple RFFE buses $124_1$-$124_N$ to couple various front-end devices 112, 114, 116, 118, 120, 122. A modem 104 may include one or more RFFE interfaces 1081-108N each of which couples the modem 104 to a corresponding RFFE bus $124_1$-$124_N$. The modem 104 may communicate with a baseband processor 106 through a separate communication link 110. The illustrated device 102 may be embodied in one or more of a mobile communication device, a mobile telephone, a mobile computing system, a mobile telephone, a notebook computer, a tablet computing device, a media player, a gaming device, a wearable computing and/or communications device, an appliance, or the like. In various examples, the device 102 may be implemented with one or more baseband processors 106, modems 104, multiple communications links 110, $124_1$-$124_N$ including multiple RFFE buses $124_1$-$124_N$ and/or other types of buses. The device 102 may include other processors, circuits, modules and may be configured for various operations and/or different functionalities.

In the example illustrated in FIG. 1, one RFFE bus $124_N$ is coupled to an RF integrated circuit (RFIC 112) and an RF tuner 114. The RFIC 112 may include one or more controllers, state machines and/or processors that configure and control certain aspects of the RF front-end. Another RFFE bus $124_2$ may couple the modem 104 to a switch 116 and an LNA 118. The LNA 118 may be a radio frequency amplifier that is provided noise amplifier (LNA) to increase signal strength of RF signals before to improve receiver sensitivity and/or to compensate for loss attributable to the signal path between antenna and receiver. Another RFFE bus $124_1$ may couple the modem 104 to a power amplifier (PA 120) and a power tracking module 122. Other types of devices may be coupled by one or more of the RFFE buses $124_1$-$124_N$, and other assignments and allocations of devices 112, 114, 116, 118, 120, 122 to RFFE buses $124_1$-$124_N$ may be configured according to application needs.

The system 100 may include multiple instances of certain device types (e.g. switch 116, LNA 118, PA 120 and other types of device) that may operate concurrently in a manner that can generate inter-device interference, or that could potentially cause damage to one or more devices. Devices that may interfere with one another may exchange coexistence management (CxM) messages to permit each device to signal imminent actions that may result in interference or conflict. CxM messages may be used to manage operation of shared components including switch 116, LNA 118, PA 120 and/or an antenna.

Figure 2:
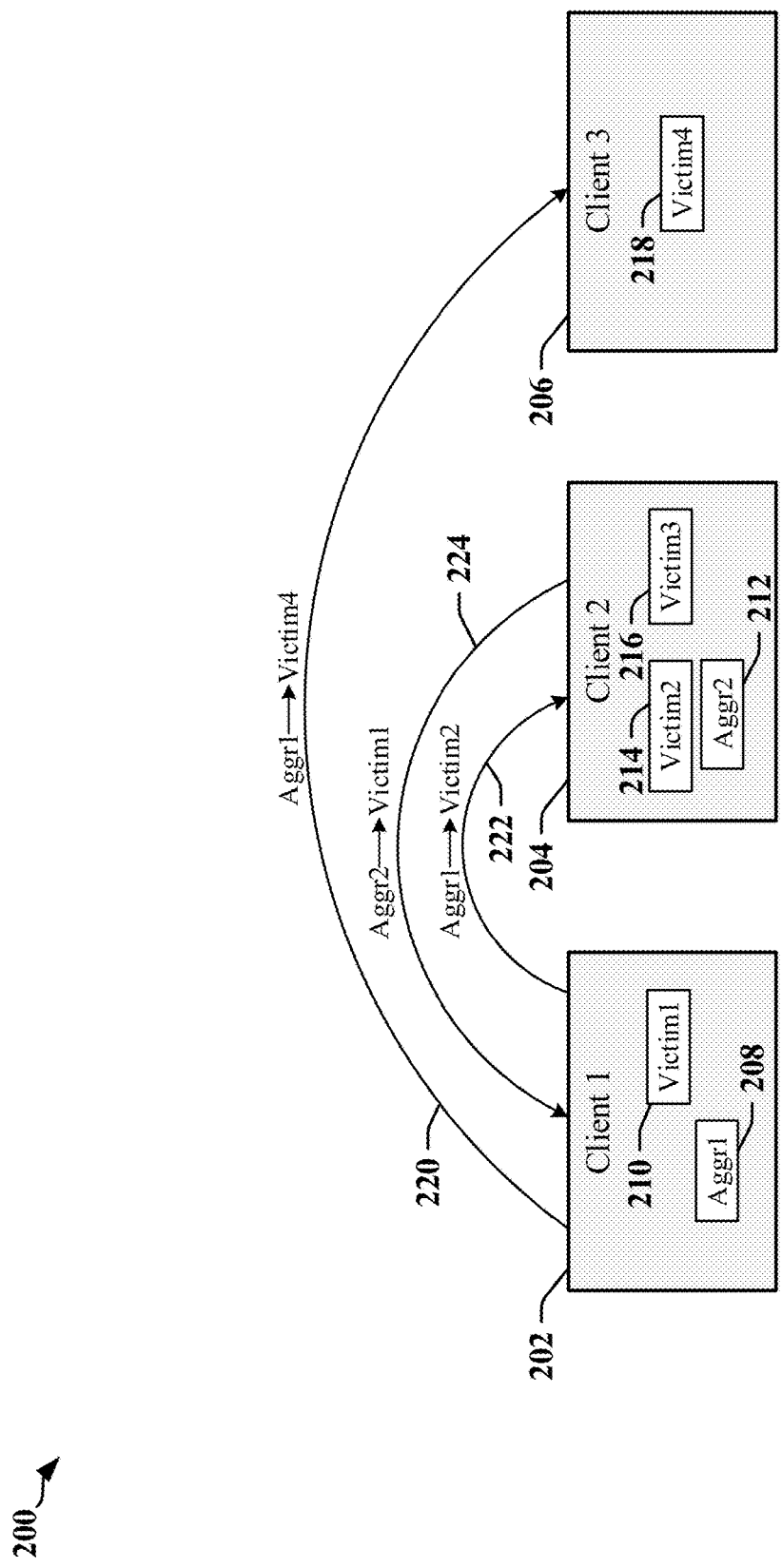
FIG. 2 illustrates examples of coexistence issues that may cause a device to take mitigating action in response to a coexistence management message.

FIG. 2 illustrates an example 200 of certain coexistence issues that may cause a device 202, 204, 206 to take mitigating action in response to a coexistence management message. Each device 202, 204, 206 includes one or more aggressors 208, 212 and/or one or more victims 210, 214, 216, 218. An aggressor 208, 212 may be an antenna or other source of radiative energy that may interfere with, or affect the operation of another RF component. For example, an aggressor 208, 212 may transmit relatively high-power RF signals at frequencies near to the operating frequency of an RF receiver. The RF receiver may be unable to receive a relatively low-power RF signal of interest due to overwhelming interference. In some instances, sensitive RF components may be damaged by high-power interfering RF signals.

In the illustrated example 200, a first device 202 includes an aggressor (Aggr1 208) that may transmit a first interfering signal 222 that affects the operation of a victim component (Victim2 214) in a second device 204. Aggr1 208 may transmit a second interfering signal 220 that affects the operation of another victim component (Victim4 214) in a third device 206. The interfering signals 220, 222 may derive the same transmission or different transmissions. The second device 204 includes an aggressor (Aggr2 212) that may transmit an interfering signal 224 that affects the operation of a victim component (Victim1 210) in the first device 202.

In any device 202, 204, 206 there can be more than one concurrently victimized components. In some examples, there can be 5 or more aggressors when advanced RATs are involved, including 5G New Radio. In any device 202, 204, 206 there can be a victim 210, 214, 216, 218, an aggressor 208, 212 or some combination of victims 210, 214, 216, 218 and aggressors 208, 212.

Figure 3:
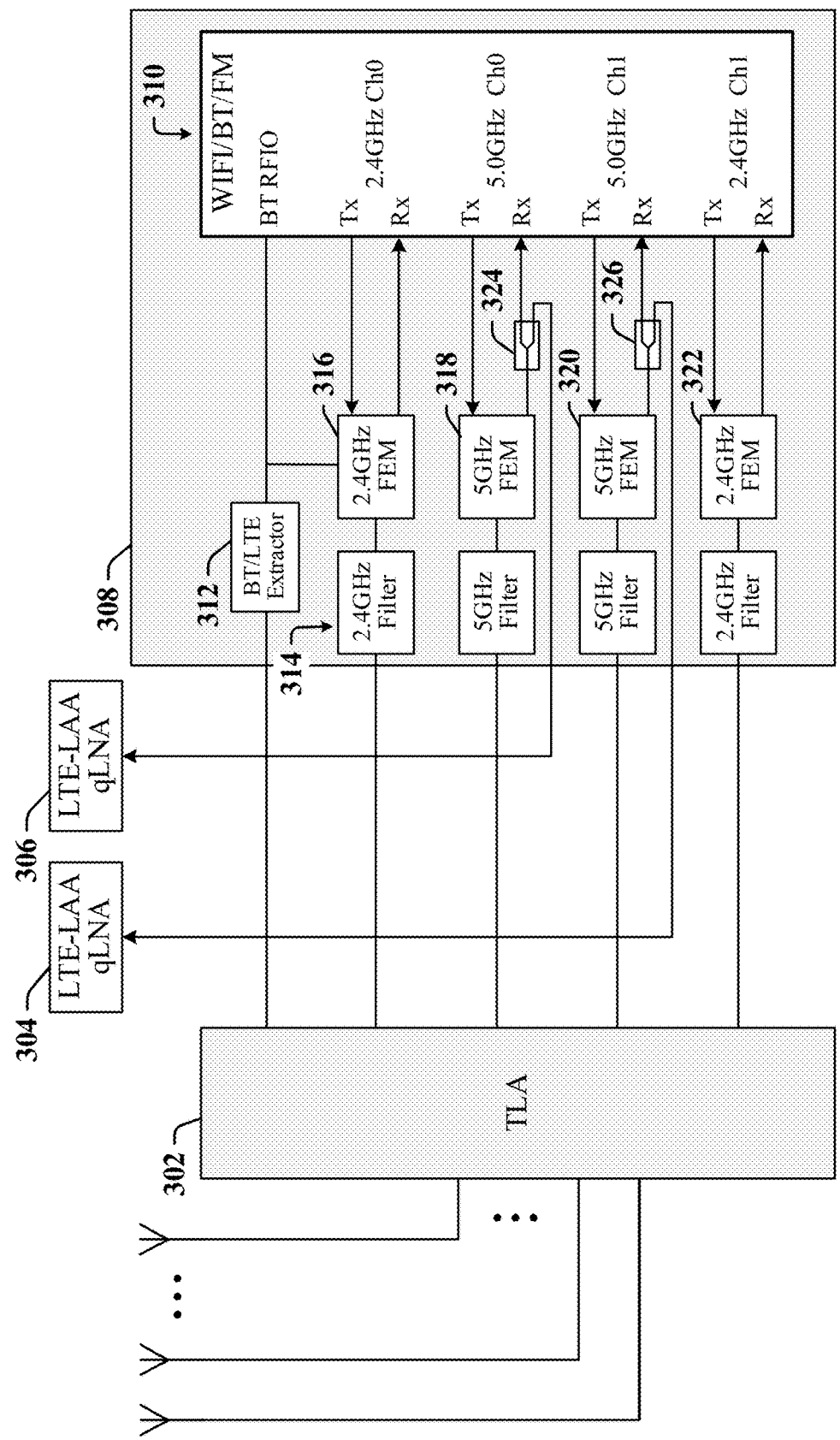
FIG. 3 illustrates a system that may be susceptible to coexistence issues that may be adapted in accordance with certain aspects disclosed herein.

FIG. 3 illustrates a system 300 that may be susceptible to coexistence issues. The system 300 employs a splitter-based antenna sharing scheme for different radio access technologies (RATs 310). The 3rd Generation Partnership Project (3GPP) defines specifications for fourth generation (4G) technologies including the long-term evolution (LTE) and enhancements of LTE. After deployment, LTE networks have experienced ever-increasing demand for data throughput, and certain improvements to LTE support the increased quantities of data exchanged through LTE networks. One improvement that uses both licensed and unlicensed spectra for data communication may be referred to as LTE License Assisted Access (LTE-LAA) or simply LAA. In one example, an LTE-LAA implementation may use frequencies at the 2.4 GHz and 5 GHz unlicensed industrial, scientific, and medical radio bands (ISM band) to provide additional radio bandwidth. The use of these bands can create coexistence issues with Bluetooth radios (2.4 GHz) and WLAN radios (5 GHz).

In the illustrated system 300, a plurality of channels is provided. Each channel may be associated with one or more antennas 302. Each WLAN channel includes a coexistence filter 314 and a front-end module (FEM 316, 318, 320 or 322). When a channel is shared between a WLAN-5 GHz radio and an LTE-LAA radio, a splitter 324 is provided in the receive path after the corresponding FEM 316, 318, 320 or 322.

Figure 4:
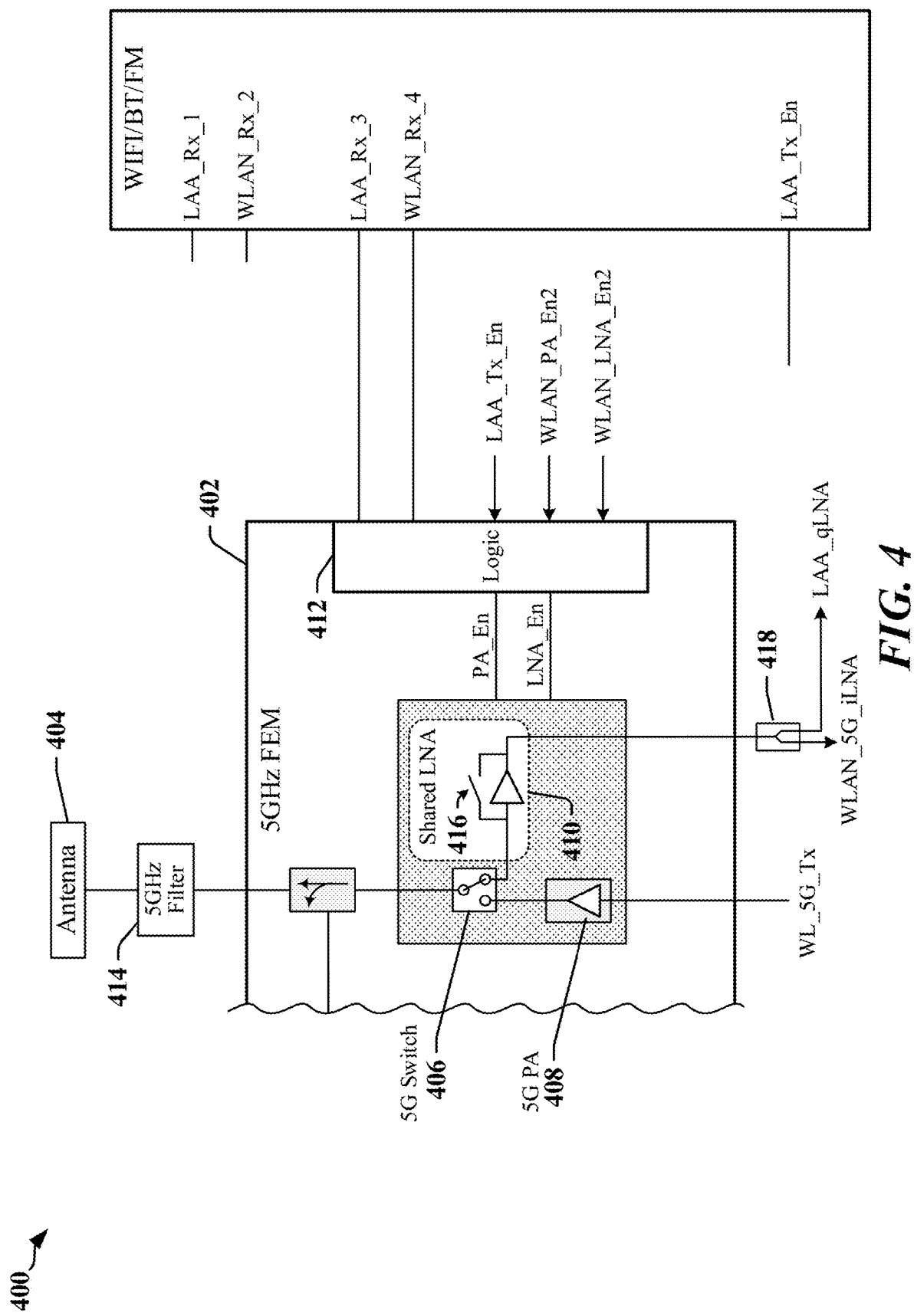
FIG. 4 is a detailed view of a portion of a 5G front-end module that includes a shared low-noise amplifier provided in accordance with certain aspects disclosed herein.

FIG. 4 is a detailed view 400 showing a portion of a 5G FEM module 402 that includes a shared LNA 410. The 5G FEM module 402 may correspond to the FEMs 318, 320 illustrated in FIG. 3. The 5G FEM module 402 is coupled through a filter 414 to one or more antennas 404. The 5G FEM module 402 may include or be coupled to the filter 414. A switch 406 selects between transmit and receive modes. A transmit signal provided to the switch by a PA 408 is passed through the switch to the filter 414 and antenna 404 when the switch is a first position. A receive signal provided to the switch by the filter 414 is passed through the switch to the shared LNA 410 when the switch is a second position. The output of the shared LNA 410 may be coupled to a splitter 418 provides outs for an internal LNA and a quadrature LNA such as the qLNA 306. The shared LNA 410 may be protected by a bypass switch 416 that may be closed when the 5G FEM module 402 is transmitting. The 5G FEM module 402 may include logic 412 that determines modes of operation and selects between transmit and receive. The 5G FEM module 402 may control the switches 406, 416.

In the system 300 illustrated in FIG. 3, one or more antennas 302 may be shared by different RATs 310. For example, an LTE-LAA RAT may share one or more antennas 302 with a WLAN-5 GHz RAT using splitter-based antenna sharing. The transmit activity of a WLAN radio transmitter may be monitored in accordance with radio link monitoring (RLM) procedures defined for LTE-LAA. WLAN operates as a Time Division Duplex (TDD) technology, such that the WLAN receiver is idle when the WLAN radio is transmitting, and the WLAN transmitter is idle when the WLAN radio is receiving. When the WLAN radio is receiving, there can be concurrency with LTE-LAA receiver because an antenna is shared by the WLAN-5 GHz and LTE-LAA RATs. When the WLAN radio is receiving, the input signal may be routed using a receive path for the LTE-LAA radio coupled to the shared antenna that connects a quadrature LNA (qLNA 304, 306) and an internal LNA (iLNA):
Shared-Antenna 404→shared LNA 410→splitter 418→LAA qLNA→LAA iLNA.

In some implementations, antenna sharing may be accomplished through a switched solution, where concurrency of LTE-LAA and WLAN receivers is not desired or needed. Typically, only one of the RATs 310 can be active at any given time when switches are used.

Certain aspects disclosed herein enable the communication of coexistence information including information related to WLAN-5 GHz transmitter activity for use in LTE-LAA RLM procedures. When there is high activity of WLAN-5 GHz, The LTE-LAA radio can use the coexistence information regarding the WLAN-5 GHz transmitter to declare virtual radio link failure (RLF) and, when there is low WLAN-5 GHz transmitter activity, the LTE-LAA radio may be able to recover from RLF.

In some aspects, the sharing of LNAs used in the receiver front-end provides motivation for the LTE-LAA radio to know gain-state settings of the shared LNA 410 in the receive path when the WLAN-5 GHz radio has control of the shared LNA 410 gain state settings. The LTE-LAA radio has a need to know the current gain state of the shared LNA 410 in order to properly or optimally adjust its automatic gain control (AGC) gain lineup. For example, the gain provided by one or more components in an AGC circuit or loop may be configured or adjusted based on the current gain state of the shared LNA 410.

Figure 5:
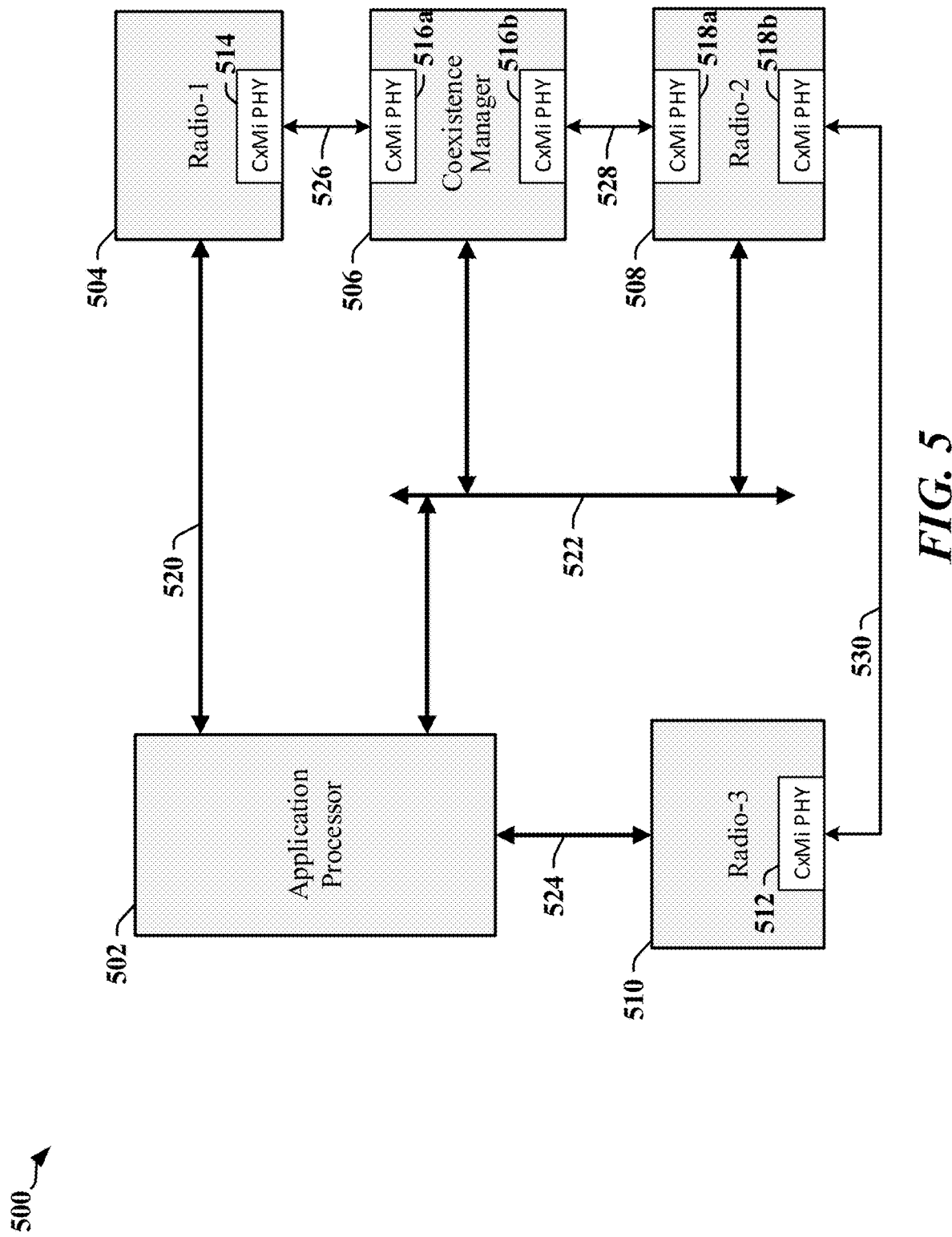
FIG. 5 illustrates certain aspects of a system adapted to support coexistence management functions.

FIG. 5 illustrates certain aspects of a system 500 adapted to support coexistence management functions. An application processor 502 may manage or control multiple radios 504, 508, 510, each of which may include one or more modems, transceivers, antennas, etc. The application processor 502 may communicate with the radios 504, 508, 510 through one or more links 520, 522, 524. In some instances, the multiple radios 504, 508, 510 share certain circuits, antennas and other resources. The system 500 may provide or employ a coexistence manager 506 that may be a stand-alone device and/or employ functions and circuits in one or more devices 502, 504, 506, 508, 510. In one example, the coexistence manager 506 may communicate with radios 504, 508 through point-to-point CxM links 526, 528, respectively. In another example, coexistence management functions in two radios 508, 510 may interact through a point-to-point CxM link 530. CxM physical interface circuits 512, 514, 516a, 516b, 518a, 518b provided in the radios 504, 508, 510 and/or coexistence manager 506 may be based on a UART that can be configured for full-duplex operation.

In one example, a mobile device includes various radios to provide a variety of functions for the user. For purposes of this example, a cellular telephone may include a third generation (3G), fourth generation (4G) and/or fifth generation (5G) radio for voice and data, an IEEE 802.11 (wireless local area network or WLAN) radio, a Global Positioning System (GPS) radio, and/or a Bluetooth radio, where two or more radios may operate simultaneously.

The coexistence manager 506 and/or coexistence management functions and circuits can manage operation of respective radios 504, 508, 510 in order to avoid interference and/or other performance degradation associated with collisions between respective radios 504, 508, 510. Coexistence management functions typically require deterministic communication of commands, configuration and other information. A point-to-point UART based link can provide sufficiently low latency to support coexistence management functions. Conventional shared communication links 520, 522, 524 and communication protocols may be unable to meet the latency requirements needed to support coexistence management functions.

Figure 6:
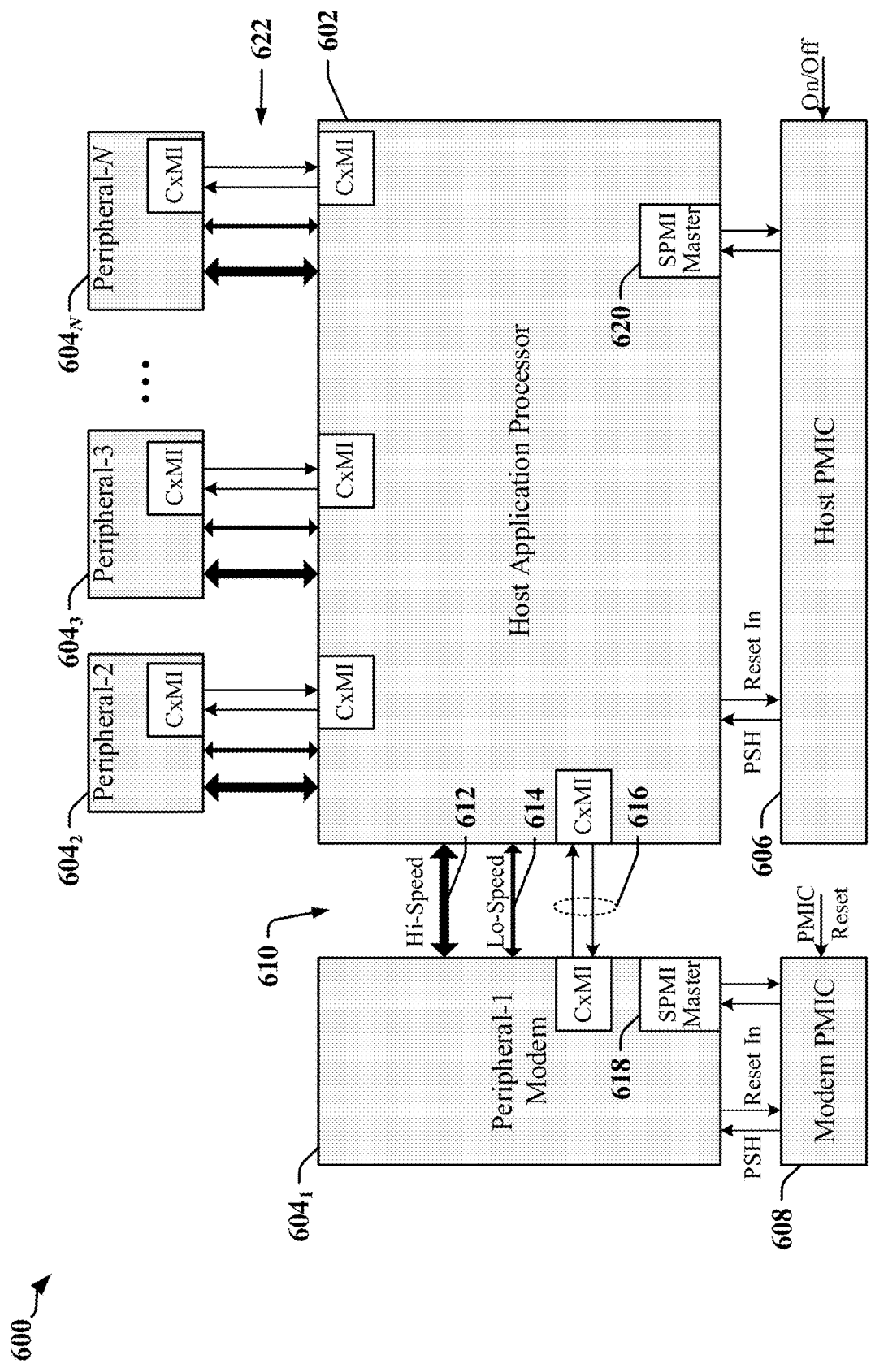
FIG. 6 illustrates an example of a system that includes multiple CxMi links.

FIG. 6 illustrates an example of a system 600 that includes multiple CxMi links. The system 600 includes an application processor 602 that may serve as a host device on various communication links 610, 622, and may control communication with multiple peripherals $604_1$-$604_N$, and one or more power management integrated circuits (PMICs 606, 608). In the illustrated system 600, at least a first peripheral $604_1$ may include a modem.

The application processor 602 and the first peripheral $604_1$ may be coupled to respective PMICs 606, 608 using general-purpose input/output (GPIO) that provides a combination of reset and other signals, and a system power management interface (SPMI 618, 620). The SPMI 618, 620 protocol defined by the MIPI Alliance provides a serial interface that is optimized for the real-time control of devices including PMICs 606, 608. The SPMI 618, 620 may be configured as a shared bus that provides a high-speed, low-latency connection for multiple devices, where data transmissions may be managed according to priorities assigned to different traffic classes.

The application processor 602 may be coupled to each of the peripherals $604_1$-$604_N$ using multiple communication links 610, 616, 622. For example, the application processor 602 may be coupled to the first peripheral $604_1$ using a high-speed bus 612, a low-speed bus 614 and a two-wire CxMI link 616.

The system 600 may include one or more coexistence management functions. In some examples, coexistence management may be implemented and/or coordinated using a manager (e.g., the coexistence manager 506 of FIG. 5) provided in the application processor 602 or another device. In some implementations, coexistence management may be implemented in various devices of the system 600.

Figure 7:
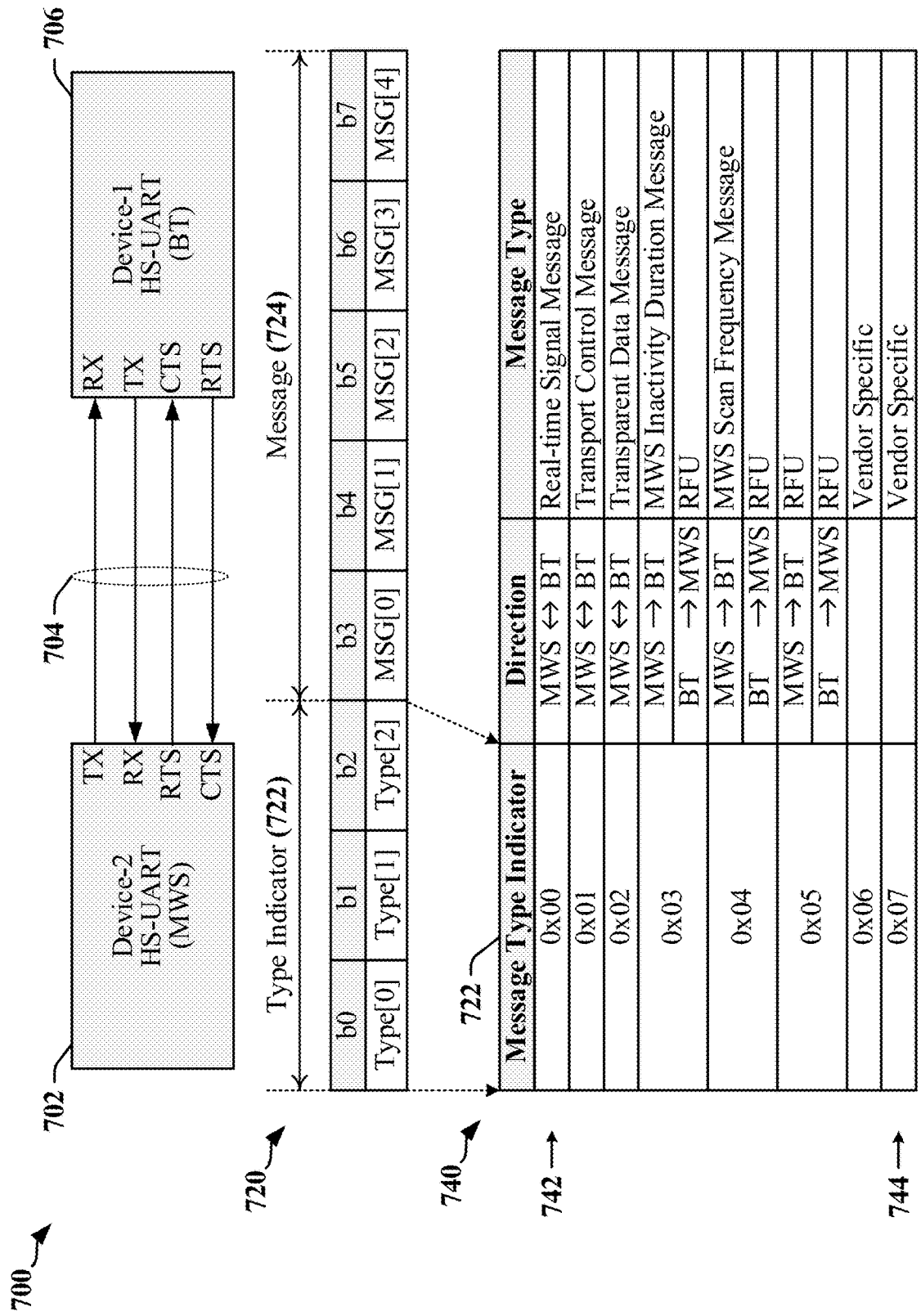
FIG. 7 illustrates a CxM interface (CxMi) that may be implemented using a point-to-point CxMi link coupling a pair of UARTs.

FIG. 7 illustrates a CxM interface (CxMi 700) that may be implemented using a point-to-point CxMi link 704 coupling a pair of UARTs 702, 706. In one example, the link 704 may be operated at 6 Mbps. A first UART 702 is deployed in a mobile wireless service (MWS) radio and a second UART 706 is deployed in a radio configured for Bluetooth (BT) communications. The UARTs 702, 706 exchange CxMi messages, commands and/or control information over the two-wire, point-to-point CxMi link 704. In one example, data is clocked on the CxMi link 704 at 4 megabits per second (Mbps). Each 8-bit byte of data transferred through the CxMi link 704 is preceded by a start bit and followed by a stop bit, and transmission is accomplished in 10 clock cycles, or 2.5 µs.

FIG. 7 also includes an example of a datagram 720 for a wireless coexistence interface (WCI). In some implementations, the datagram 720 may comply or be compatible with a datagram provided in accordance with the WCI-2 protocol defined for communication using a UART-based CxMi 700. The datagram includes a type indicator field 722 and a message field 724. The type indicator field 722 has a length of 3 bits that identify the content of the message field 724. The 8 message types are defined in the table 740 in FIG. 7. The Type-0 message 742 has a value of 0x00 and can carry real-time messages with strict latency targets. When the CxMi link 704 is operated at 4-Mbps, transmissions including a Type-0 message 742 include 1 Start bit, 8 data-bits and one Stop-bit for a total of 10 bits. Transmission time is 2.5 µs and Type-0 messages 742 are subjected to hard real-time, deterministic constraints, where transmissions are expected to be completed in less than 3 µs, in some examples.

Figure 8:
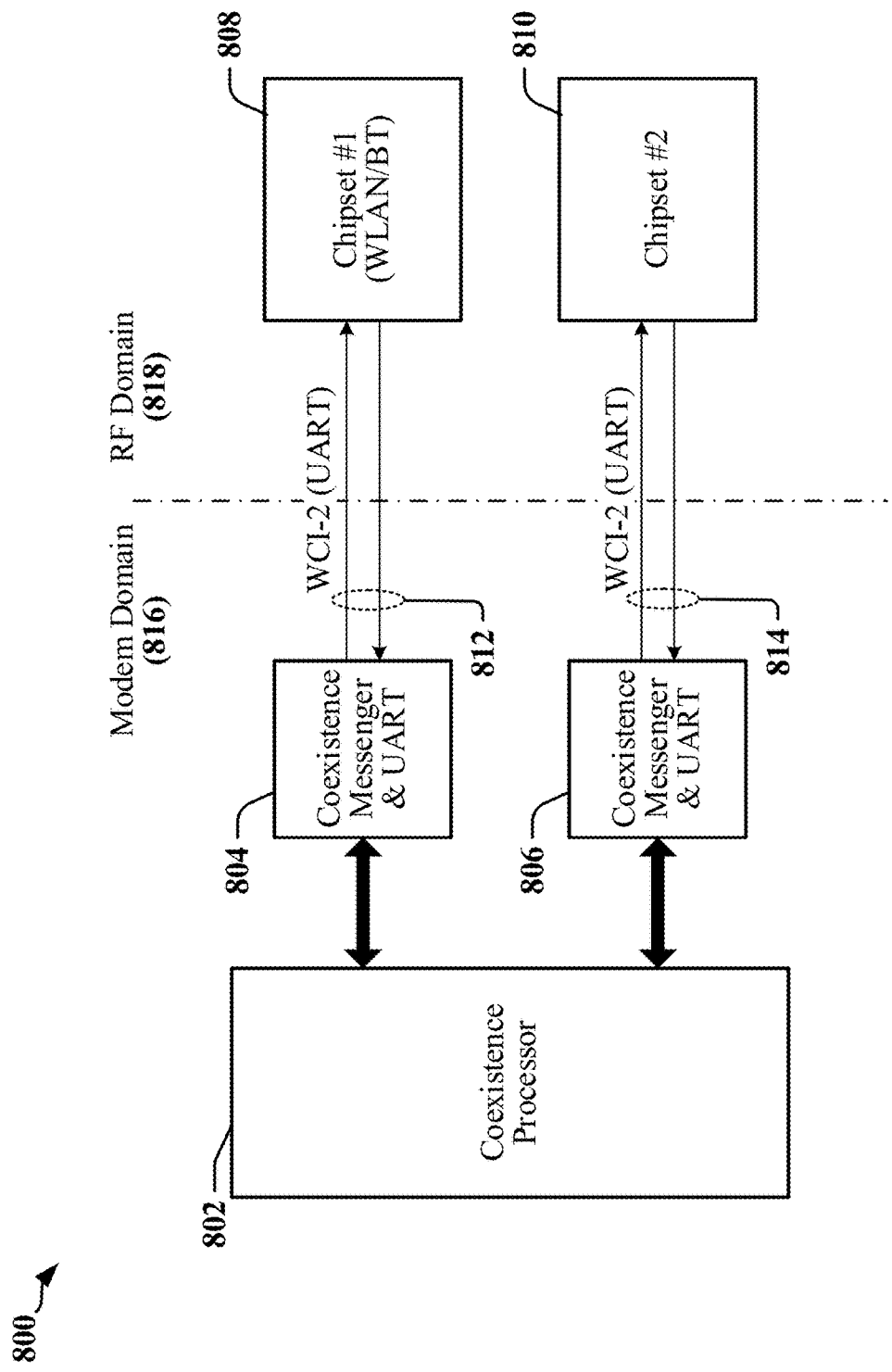
FIG. 8 illustrates an example of an example of a radio frequency co-existence management architecture that may be implemented in a mobile device.

FIG. 8 illustrates an example of an RF Co-Existence management architecture 800 that may be implemented in a mobile device. The RF Co-Existence management architecture 800 may include multiple instances of low-bandwidth point-to-point interfaces, typically implemented using a UART that exchanges low volume, low-latency coexistence information between devices. In one example, the coexistence information is transmitted as a single byte between a modem domain 816 and an RF domain 818. The RF domain 818 may include one or more RF devices, which may include a WLAN/Bluetooth chipset 808 and one or more other RF chipsets 810. In the illustrated example, each RF chipset 808, 810 communicates with a corresponding coexistence messenger 804, 806 over a 2-wire or 4-wire point-to-point link 812, 814 implemented using UARTs provided in the RF chipsets 808, 810 and coexistence messengers 804, 806. The coexistence messengers 804, 806 may be managed and/or controlled by a coexistence processor 802 or other controller, state machine, processor and/or algorithms that executes coexistence management software.

Communicating Coexistence Information

Certain aspects disclosed herein enable communication of coexistence information between RF front-end devices. For example, including in the example where information related to WLAN-5 GHz transmitter activity for use in LTE-LAA RLM procedures. In the latter example, the LTE-LAA radio can use the coexistence information regarding the WLAN-5 GHz transmitter to declare virtual radio link failure (RLF) when there is high activity of WLAN-5 GHz, and the LTE-LAA radio may be able to recover from RLF, when coexistence information indicates that there is low WLAN-5 GHz transmitter activity. The sharing of LNAs used in the receiver front-end provides motivation for the LTE-LAA radio to know gain-state settings of the shared LNA in the receive path, when the WLAN-5 GHz radio has control of the shared LNA gain state settings. The LTE-LAA radio needs to know the current gain state of the shared LNA in order to properly or optimally adjust its AGC gain lineup. For example, the gain provided by one or more components in an AGC circuit or loop may be configured or adjusted based on the current gain state of the shared LNA.

According to certain aspects disclosed herein, a coexistence interface may be used to facilitate the sharing of certain RF front-end components. In the example of the system 300 in FIG. 3 where WLAN-5 GHz and LTE-LAA connections are established using the same antenna, shared components may include LNAs and other front-end devices. In some implementations, splitters 324, 326 may be employed to provide received RF signals to both the WLAN-5 GHz receivers and the LTE-LAA receivers and/or qLNAs 304, 306. In other implementations switches may be deployed to select between potential receivers of the received RF signals. The coexistence interface may be used to exchange information related to sharing or switching of received RF signals. The coexistence interface may be used to provide information regarding the operation of external LNAs that can be used to configure internal LNAs.

In one example, a WLAN-5 GHz radio may perform active scans while LTE-LAA is in connected mode with an active data transfer session using the 5 GHZ unlicensed band. WLAN protocols provide for periodic scanning of WLAN access points (APs) to determine a suitable AP to which the WLAN client may connect when roaming between APs. The WLAN-5 GHz radio may perform an active scan by transmitting a probe request and subsequently listening for a probe response from one or more APs. When a splitter-based antenna sharing scheme is used to allocate a single antenna to both WLAN-5 GHz and LTE-LAA radios, the LTE-LAA radio experiences a short outage of receive signal when the WLAN-5 GHz is transmitting the probe request. The use of a splitter enables concurrency while the WLAN-5 GHz is receiving because WLAN-5 GHz operates in a TDD mode. Information regarding WLAN-5 GHz radio state is needed by the LTE-LAA radio to protect baseband operations including AGC loops, frequency tracking loops/ time tracking loops (FTL/TTL) and channel estimation. Information regarding WLAN-5 GHz radio state can enable the LTE-LAA radio to determine when one or more LTE subframes are impacted by WLAN-5 GHz radio transmissions, such that baseband mitigation procedures can be triggered as needed. In some implementations, LTE subframes have a duration of 1 ms and probe requests can affect multiple subframes. The LTE-LAA radio can also make use of the WLAN-5 GHz radio transmitter activity for LTE-LAA radio link monitoring purposes. For example, the LTE-LAA radio may declare virtual RLF when WLAN-5 GHz radio transmitter activity is consistently high.

Certain aspects of this disclosure provide a mechanism by which near real-time information can be provided over a WCI-2 interface to indicate on-going WLAN-5 GHz transmitter activity. In various examples, the transmission of such information in near real-time can be facilitated using the WCI-2 Type-0 message 742 (real-time signal message) illustrated in FIG. 7 and a Type-7 message 744 defined for the purpose of real-time exchanges of information. In some implementations, other message types may be employed, reconfigured, or repurposed to carry real-time information.

In the splitter-based antenna sharing system 300 illustrated in FIG. 3, a shared common LNA is typically used between the shared antenna 302 and splitter 324, 326 to improve the receiver noise figure (NF) for both LTE-LAA and WLAN-5 GHz radios and/or to compensate for additional insertion losses associated with use of the splitter 324, 326 and increased trace route losses corresponding to longer printed circuit board (PCB) traces needed to route the received RF signal from the antenna 302 to the LTE-LAA front-end. This external LNA, which may be referred to as "xLNA" can be configured for a gain-mode (High-Gain mode or HG mode) or Bypass-Mode (BP mode).

Conventional coexistence management systems that use the WCI-2 coexistence interface are typically unable to provide adequate coexistence information when the WLAN-5 GHz radio is transmitting. Furthermore, the conventional WCI-2 coexistence interface may be unable to provide adequate coexistence information when the LTE-LAA and WLAN-5 GHz shared LNA (xLNA) is in HG mode or BP mode.

Certain aspects of this disclosure provide mechanisms and techniques by which near real-time information can be provided over a WCI-2 coexistence interface adapted to provide feedback information including shared xLNA gain state obtained from the xLNA device. With reference also to FIG. 7, the transmission of such feedback information in near real-time can be facilitated in certain implementations using the WCI-2 Type-0 message 742 and a Type-7 message 744 defined for the purpose of real-time exchanges of information. The feedback information may be consumed by a gain setting controller module in the LTE-LAA radio. In some instances, a controller having some combination of hardware modules and/or software modules may be configured to set the total LNA gain line-up across different LNA devices in the receive chain. In one example, the LNA devices used in the LTE-LAA antenna-sharing context can include an xLNA shared with a WLAN-5 GHz receiver, a qLNA provided on the external LTE-LAA receiver path, and internal LNA (iLNA) in a WLAN-5 GHz radio device. The feedback information provided over the WCI-2 coexistence interface can be used to determine whether the xLNA is in HG mode or BP mode, such that other LNAs on the LTE-LAA receive path can be adjusted accordingly.

Figure 9:
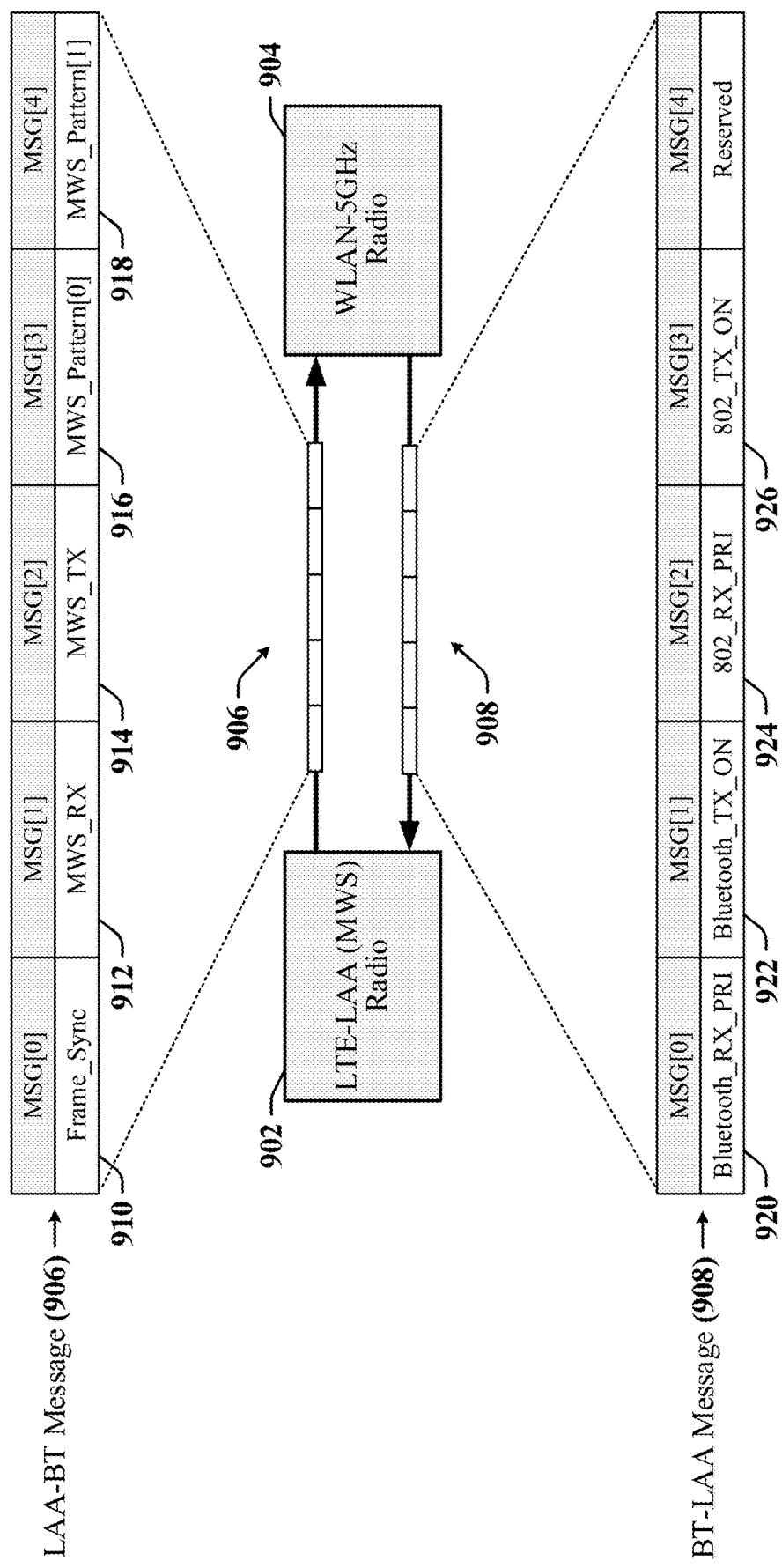
FIG. 9 illustrates the format of WCI-2 Type-0 message payloads exchanged by an LTE-LAA radio and a WLAN-5 GHz radio.

FIG. 9 illustrates the format 900 of WCI-2 Type-0 message payloads 906, 908 exchanged by an LTE-LAA radio 902 and a WLAN-5 GHz radio. The Type-0 message payloads 906, 908 may be carried in the Type-0 message 742 illustrated in FIG. 7. The content of the Type-0 message payloads 906, 908 may be defined by industry standards and are conventionally used in mitigating coexistence issues between Bluetooth radios and Mobile Wireless Standards (MWS) devices, including the LTE-LAA radio 902. The WCI-2, Type-0 message payloads 906, 908 may be adapted for use in a splitter-based antenna sharing system 300 adapted in accordance with certain aspects disclosed herein.

A first WCI-2 Type-0 message payload 906 transmitted by the LTE-LAA radio 902 and includes various bits that serve as virtual coexistence signals. A Frame_Sync bit 910 is transmitted by the LTE-LAA radio 902 to indicate the start of LTE frames, based on LTE network timing. The Frame_Sync bit 906 enables other radios 904 to align transmission and reception activity with the LTE network frame structure. An MWS_RX bit 912 is transmitted by the LTE-LAA radio 902 to indicate that an LTE reception is occurring, and to request other radios 904 cease ongoing transmission and refrain from starting new transmissions. An MWS_TX bit 914 is transmitted by the LTE-LAA radio 902 to indicate transmission state of the LTE-LAA radio 902. MWS Pattern bits 916, 918 are transmitted by the LTE-LAA radio 902 to indicate one of three possible patterns intended to control activity of the other radios 904.

A second WCI-2 Type-0 message payload 908 may be transmitted by the WLAN-5 GHz radio 904. The second WCI-2 Type-0 message payload 908 includes various bits that serve as virtual coexistence signals. A Bluetooth_RX_PRI bit 920 is conventionally used by a Bluetooth Controller to indicate that the Bluetooth Controller is expecting a high priority message and to request that the MWS device (here, the LTE-LAA radio 902) cease its transmission and/or refrain from starting a transmission. The Bluetooth_TX_ON bit 922 is conventionally used by a Bluetooth Controller to indicate that it is actively transmitting. An IEEE_802_RX_PRI bit 924 is conventionally used by a WLAN-2.4 GHz radio to indicate request that the WLAN-2.4 GHz radio collocated with a Bluetooth radio is expecting a high priority message and to request that the Bluetooth radio stop or refrain from starting any transmission. The IEEE_802_TX_ON bit 926 is conventionally used by a WLAN-2.4 GHz radio collocated with a Bluetooth radio to indicate that the WLAN-2.4 GHz radio is actively transmitting. In conventional systems, the Bluetooth_RX_PRI bit 920, the Bluetooth_TX_ON bit 922, the IEEE_802_RX_PRI bit 924 and the IEEE_802_TX_ON bit 926 are not used for coexistence with radios operating at 5 GHz because the conventional Bluetooth radio operates at 2.4 GHz and does not operate at 5 GHz.

According to certain aspects disclosed herein, a WLAN-5 GHz radio 904 may transmit a Transmitter-On indication to an LTE-LAA radio 902 using the WCI-2 coexistence interface. The conventional WCI-2 Type-0 message provides no bits for 5 GHz coexistence signals. A WCI-2 interface may be adapted in accordance with certain aspects disclosed herein to use a combination of Type-0 and Type-7 messages 742, 744 (see FIG. 7) to enable communication of a WLAN-5 GHz IEEE 802 TX_ON. The Type-7 message 744 may be configured to indicate the corresponding info of IEEE_802_TX_ON (MSG[3]) in a WCI-2 Type-0 message 742 is to be interpreted as relating to WLAN-5 GHz and indicating whether the transmitter is active. In conventional systems, the MSG[3] bit in a WCI-2 Type-0 message 742 is used to indicate the IEEE_802_TX_ON for WLAN-2.4 GHz. There is no explicit provision in Bluetooth specifications enabling the WCI-2 Type-0 message 742 to be used for WLAN-5 GHz messages.

In one aspect disclosed herein, gain settings for LNAs shared between a WLAN-5 GHz radio 904 and an LTE-LAA radio 902 can be provided through a modified WCI-2 interface. The shared gain settings may indicate whether the LNA is in HG mode or BP mode. In one example, the MSG[0] and MSG[1] bits 920, 922 of a WCI-2 Type-0 message 742 can be repurposed to provide gain setting information when the WCI-2 Type-0 message 742 is preceded by a WCI-2 Type-7 message 744 that indicates the WCI-2 Type-0 message 742 relates to WLAN-5 GHz operation. In one example, the MSG[0] bit 920 is used to indicate for WLAN-5 GHz channel-0 (and/or antenna 0) HG mode/BP mode state, and the MSG[1] bit 922 is used to indicate for WLAN-5 GHz channel-1 (and/or antenna 1) HG mode/BP mode state. Conventionally, the MSG[0] bit 920 and MSG[1] bit 922 is used for Bluetooth purposes on 2.4 GHz band. These bits can be repurposed for WLAN-5 GHz because Bluetooth is not specified for operation at 5 GHz.

In one aspect disclosed herein, LTE-LAA operations may be supported using the MSG[0] bit 920 and MSG[1] bit 922 in a WCI-2 type-0 message 742. The MSG[0] bit 920 and MSG[1] bit 922 may be used to signal whether the xLNA is in HG mode or BP mode after an appropriately-configured WCI-2 type-7 message indicates the following WCI-2 type-0 message is related to LTE-LAA operations.

In some implementations, frequent switching between LTE-LAA LNA gain line-up settings corresponding to xLNA HG and BP modes can be avoided through the use of a hysteresis timer. The information provided in the combination of the WCI-2 Type-0 and Type-7 messages 742, 744 can inform the configuration of the total LTE-LAA receive chain for LNA gain programming with the shared antenna and shared xLNA from, for example:

$$\text{xLNA(HG)+qLNA+iLNA, or} \qquad (i)$$

$$\text{xLNA(BP)+qLNA+iLNA.} \qquad (ii)$$

Examples of Processing Circuits and Methods

Figure 10:
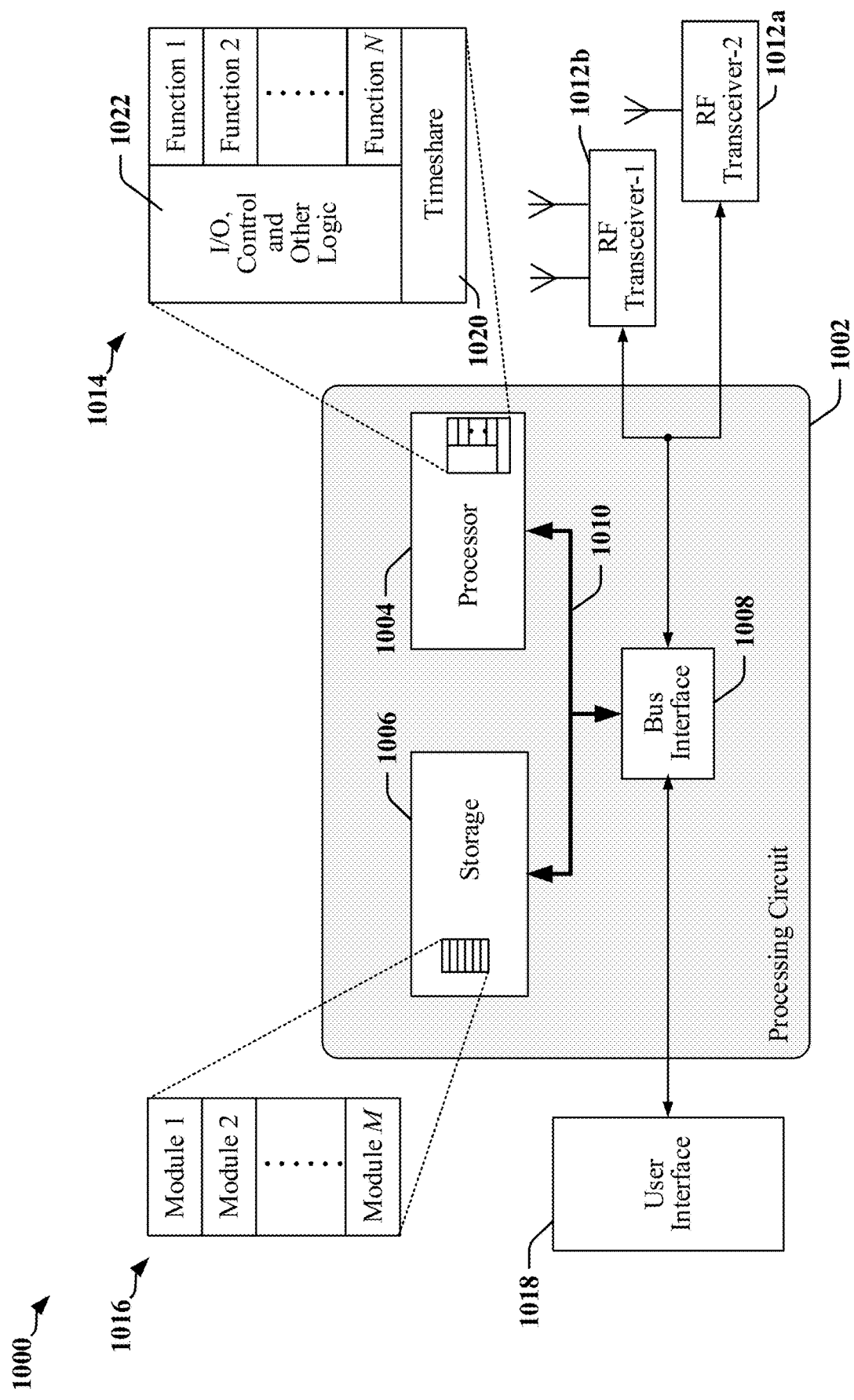
FIG. 10 illustrates one example of an apparatus employing a processing circuit that may be adapted according to certain aspects disclosed herein.

FIG. 10 is a diagram illustrating an example of a hardware implementation for an apparatus 1000 employing a processing circuit 1002. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices and may be referred to herein as computer-readable media and/or processor-readable media.

The bus 1010 may also link various other circuits such as timing sources, timers, peripherals, voltage regulators, and power management circuits. A bus interface 1008 may provide an interface between the bus 1010 and one or more RF transceivers 1012a, 1012b. An RF transceiver 1012a, 1012b may be provided for each networking technology supported by the processing circuit. In some instances, multiple networking technologies may share some or all of the circuitry or processing modules found in an RF transceiver 1012a, 1012b. Each RF transceiver 1012a, 1012b provides a means for communicating with various other apparatus over a transmission medium. In one example, each RF transceiver 1012a, 1012b may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004 and may manage access to external devices such as the RF transceiver 1012a, 1012b, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the RF transceiver 1012a, 1012b, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the RF transceiver 1012a, 1012b, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
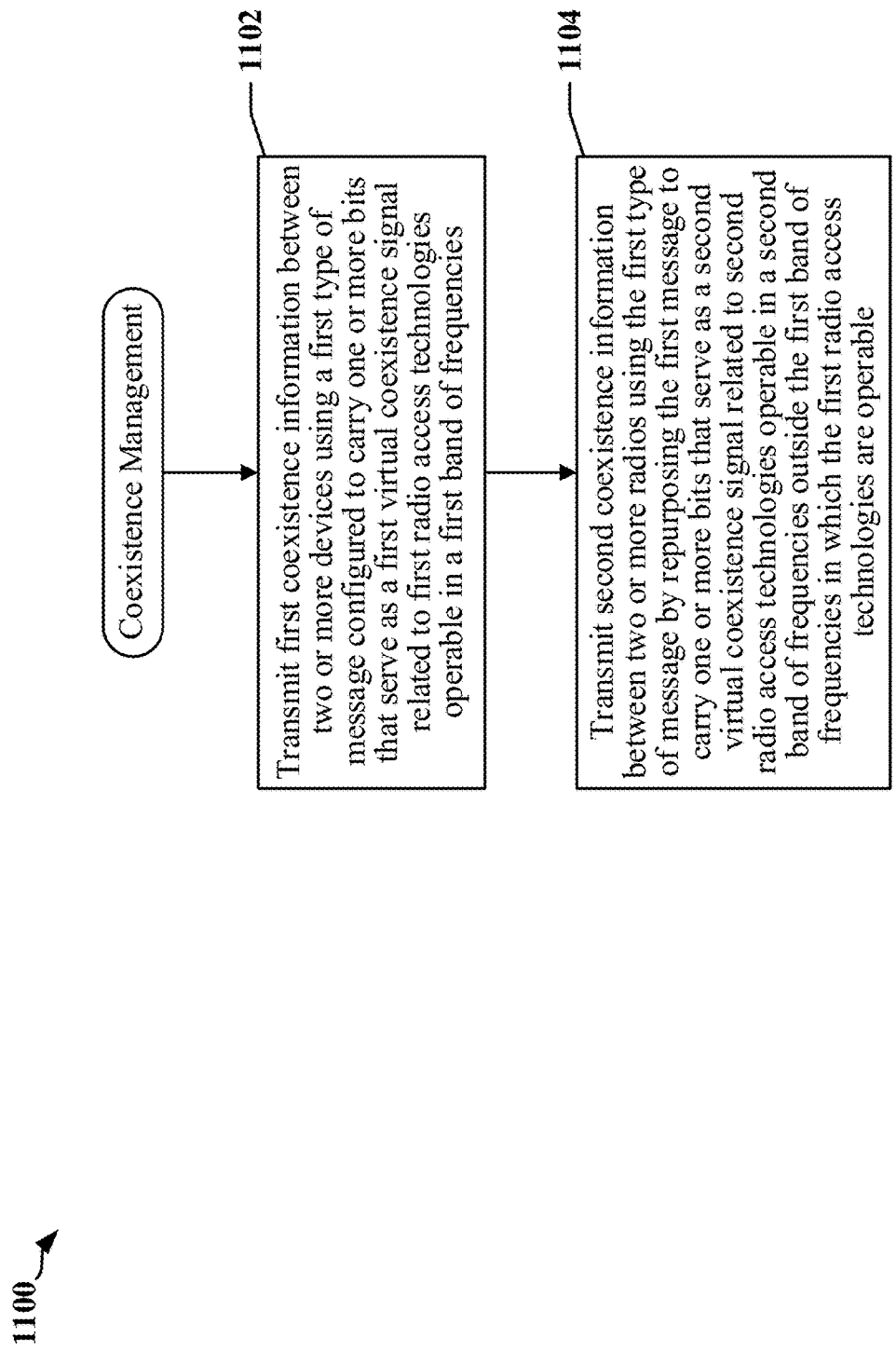
FIG. 11 is a flowchart illustrating certain operations of device adapted in accordance with certain aspects disclosed herein.

FIG. 11 is a flowchart 1100 of a method that may be performed at a radio frequency device that communicates through a shared antenna. At block 1102, the device may transmit first coexistence information between two or more devices using a first type of message configured to carry one or more bits that serve as a first virtual coexistence signal related to first radio access technologies operable in a first band of frequencies. At block 1104, the device may transmit second coexistence information between two or more radios using the first type of message by repurposing the first type of message to carry one or more bits that serve as a second virtual coexistence signal related to second radio access technologies operable in a second band of frequencies outside the first band of frequencies in which the first radio access technologies are operable. A receiver in each of the two or more radios is coupled to a common antenna through a splitter.

In certain examples, the transmitting a second type of message indicating that the second coexistence information relates to at least one of the second radio access technologies. The first RATs may include Bluetooth and WLAN-2.4 GHz RATs, where both of the first RATs are operable at 2.4 GHz. The second RATs may include 4G LTE-LAA and WLAN-5 GHz RATs, operable at 5 GHz.

In certain implementations, the first and/or second types of message are WCI-2 types of message. In some examples, the first type of message is a WCI-2 Type-0 message. In some examples, the second type of message is a WCI-2 Type-7 message.

In certain implementations, the second coexistence information indicates whether a transmitter of one of the two or more radios is active. The second coexistence information may include gain settings for a low-noise amplifier. The low-noise amplifier may be located outside one of the two or more radios. The low-noise amplifier may be a quadrature low-noise amplifier. The second coexistence information may be used to configure a quadrature low-noise amplifier.

In certain implementations, the second coexistence information indicates whether a shared low-noise amplifier is in a bypass mode or a high-gain mode. The first low-noise amplifier may be shared by the first radio access technologies and the second radio access technologies.

In certain implementations, the second coexistence information includes gain settings for a shared low-noise amplifier. The shared low-noise amplifier may be shared by the first radio access technologies and the second radio access technologies. The second coexistence information may be used to configure gain settings for components of an automatic gain control circuit that receives an output of the shared low-noise amplifier. The second coexistence information may be used to configure gain settings for a quadrature low-noise amplifier that receives an output of the shared low-noise amplifier.

Figure 12:
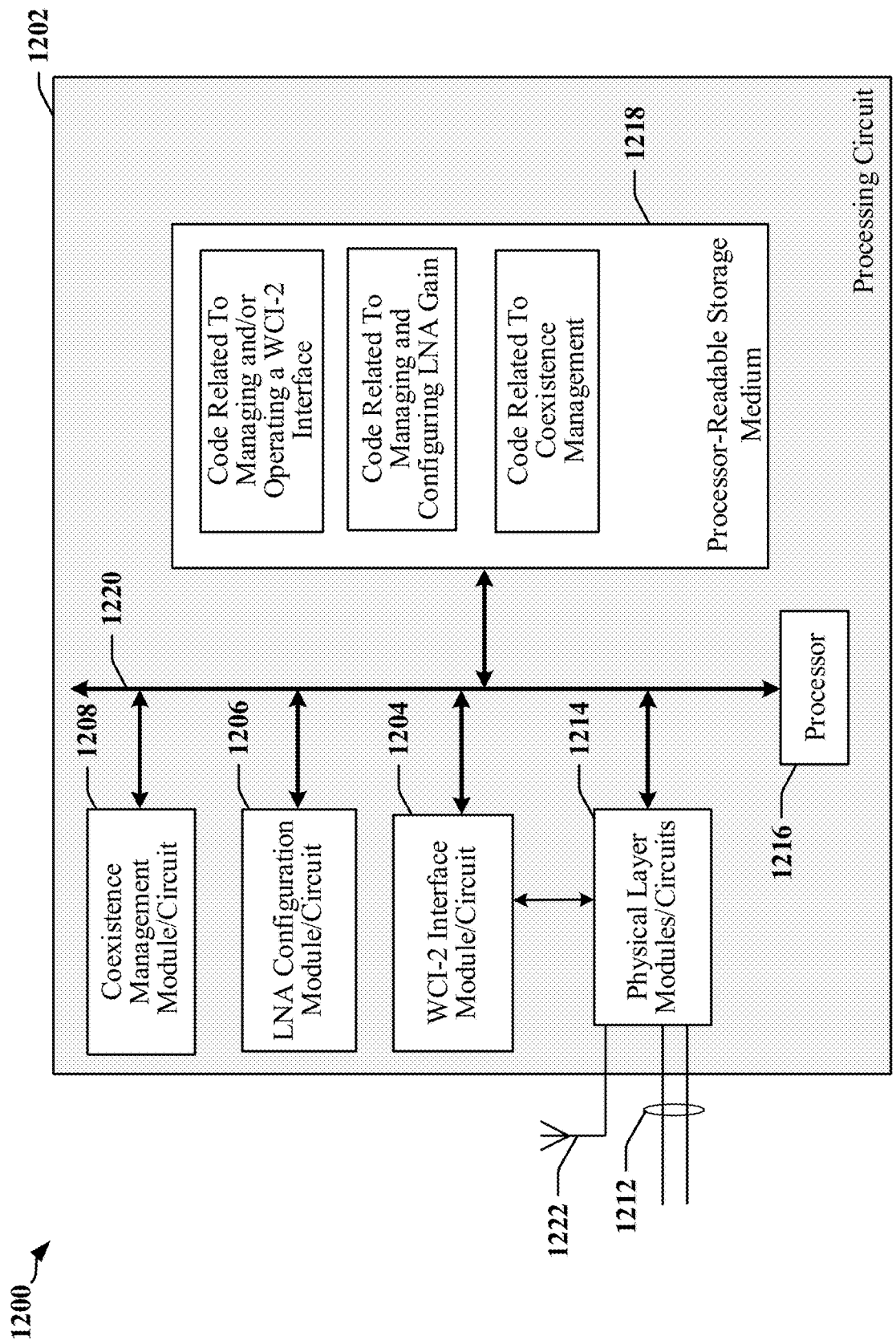
FIG. 12 illustrates an example of a hardware implementation for an apparatus adapted in accordance with certain aspects disclosed herein.

FIG. 12 is a diagram illustrating a simplified example of a hardware implementation for an apparatus 1200 employing a processing circuit 1202. The apparatus may implement a bridging circuit in accordance with certain aspects disclosed herein. The processing circuit typically has a controller or processor 1216 that may include one or more microprocessors, microcontrollers, digital signal processors, sequencers and/or state machines. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors and/or hardware modules, represented by the controller or processor 1216, the modules or circuits 1204, 1206 and 1208, and the processor-readable storage medium 1218. One or more physical layer circuits and/or modules 1214 may be provided to support communications over a communication link implemented using a multi-wire bus 1212, through an antenna 1222 (to a radio access network for example), and so on. The bus 1220 may also link various other circuits such as timing sources, peripherals, voltage regulators, and power management circuits, which are well known in the art, and therefore, will not be described any further.

The processor 1216 is responsible for general processing, including the execution of software, code and/or instructions stored on the processor-readable storage medium 1218. The processor-readable storage medium may include a non-transitory storage medium. The software, when executed by the processor 1216, causes the processing circuit 1202 to perform the various functions described supra for any particular apparatus. The processor-readable storage medium may be used for storing data that is manipulated by the processor 1216 when executing software. The processing circuit 1202 further includes at least one of the modules 1204, 1206 and 1208. The modules 1204, 1206 and 1208 may be software modules running in the processor 1216, resident/stored in the processor-readable storage medium 1218, one or more hardware modules coupled to the processor 1216, or some combination thereof. The modules 1204, 1206 and 1208 may include microcontroller instructions, state machine configuration parameters, or some combination thereof.

In one configuration, the apparatus 1200 includes modules and/or circuits 1208 configured to manage coexistence through messages transmitted over a WCI-2 coexistence interface, modules and/or circuits 1206 configured to manage and configure one or more LNAs, and modules and/or circuits 1204 configured to manage the WCI-2 coexistence interface.

In one implementation, the apparatus 1200 includes a first radio configured to communicate through a shared antenna 1222 over a first network operated in accordance with WLAN-5 GHz protocols, a second radio configured to communicate through the shared antenna over a second network operated in accordance with LTE-LAA using a licensed band of frequencies and an unlicensed 5 GHz band of frequencies. The apparatus 120 may include a multi-wire bus 1212 that is operated as a coexistence link configured to carry WCI-2 messages between the first radio and the second radio. In one example, the first radio is configured to transmit coexistence information over the coexistence link to the second radio through reuse of coexistence signals in a WCI-2 Type-0 message to carry coexistence signals related to a WLAN-5 GHz radio access technology. In some instances, the first radio may be configured to transmit coexistence information over the coexistence link to the second radio using a WCI-2 Type-0 message or other type of WCI-2 message that has been repurposed to carry bits that serve as coexistence signals related to a WLAN-5 GHz RAT. The apparatus may include a splitter configured to provide signals derived from a radio frequency signal received by the shared antenna 1222 to a receiver in each of the first radio and the second radio.

In certain examples, the first radio is configured to transmit a WCI-2 Type-7 message or other type of WCI-2 message to indicate that the second coexistence information relates to the WLAN-5 GHz radio access technology. The WCI-2 message may be repurposed through reuse of coexistence signals related to a Bluetooth RAT or a 2.4 GHz WLAN RAT. For example, one or more coexistence signals in a WCI-2 Type-0 message related to a Bluetooth radio access technology or a 2.4 GHz WLAN radio access technology are reused to carry the bits that serve as coexistence signals related to the WLAN-5 GHz radio access technology.

In some examples, the coexistence information may indicate whether a transmitter of the first radio is active. The coexistence information may include gain settings for a low-noise amplifier. The low-noise amplifier may be located outside the first radio. The low-noise amplifier may be deployed between the antenna and a splitter configured to provide signals derived from a radio frequency signal received by the common antenna to a receiver in each of the first radio and the second radio. The low-noise amplifier may be deployed within the first radio. The coexistence information may be used to configure a quadrature low-noise amplifier.

In certain examples, the coexistence information indicates whether a shared low-noise amplifier is in a bypass mode or a high-gain mode. The first low-noise amplifier may be shared by the first radio access technologies and the second radio access technologies. The coexistence information may include gain settings for a shared low-noise amplifier. The shared low-noise amplifier may be shared by the first radio access technologies and the second radio access technologies. The shared low-noise amplifier may be deployed between the shared antenna and a splitter configured to provide signals derived from a radio frequency signal received by the shared antenna to a receiver in each of the first radio and the second radio. The coexistence information may be used to configure gain settings for components of an automatic gain control circuit that receives an output of the shared low-noise amplifier. The coexistence information may be used to configure gain settings for a quadrature low-noise amplifier that receives an output of the shared low-noise amplifier.

In another implementation, the processor-readable storage medium 1218 may have data and instructions stored thereon. The instructions, when executed by at least one processor 1216 or state machine of a processing circuit 1202, may cause the processing circuit 1202 to transmit first coexistence information between two or more devices using a first type of message configured to carry one or more bits that serve as a first virtual coexistence signal related to first radio access technologies operable in a first band of frequencies. The instructions may cause the processing circuit 1202 to transmit second coexistence information between two or more radios using the first type of message by repurposing the first type of message to carry one or more bits that serve as a second virtual coexistence signal related to second radio access technologies operable in a second band of frequencies outside the first band of frequencies in which the first radio access technologies are operable. In some instances, a receiver in each of the two or more radios is coupled to a common antenna through a splitter.

The instructions may cause the processing circuit 1202 to transmit a second type of message indicating that the second coexistence information relates to at least one of the second radio access technologies. The first radio access technologies may include Bluetooth and WLAN radio access technologies and the first radio access technologies are operable at 2.4 GHz. The second radio access technologies may include fourth generation LTE-LAA and WLAN-5 GHz radio access technologies and the second radio access technologies are operable at 5 GHz. The first and second types of message may be a type of WCI-2 message. In some examples, the first type of message may be a WCI-2 Type-0 message. In some examples, the second type of message may be a WCI-2 Type-7 message.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a radio frequency device, comprising:
    transmitting first coexistence information between two or more devices using a first type of message configured to carry one or more bits that serve as a first virtual coexistence signal related to first radio access technologies operable in a first band of frequencies; and
    transmitting second coexistence information between two or more radios using the first type of message by repurposing the first type of message to carry one or more bits that serve as a second virtual coexistence signal related to second radio access technologies operable in a second band of frequencies outside the first band of frequencies in which the first radio access technologies are operable.

2. The method of claim 1, wherein a receiver in each of the two or more radios is coupled to a common antenna through a splitter.

3. The method of claim 1, and further comprising:
    transmitting a second type of message indicating that the second coexistence information relates to at least one of the second radio access technologies.

4. The method of claim 3, wherein the first radio access technologies include Bluetooth and Wireless Local Area Network (WLAN) radio access technologies and the first radio access technologies are operable at 2.4 GHz.

5. The method of claim 3, wherein the second radio access technologies include fourth generation Long-Term Evolution License Assisted Access (LTE-LAA) and WLAN-5 GHz radio access technologies and the second radio access technologies are operable at 5 GHz.

6. The method of claim 3, wherein the first type of message is a Wireless Coexistence Interface-2 (WCI-2) Type-0 message.

7. The method of claim 6, wherein the second type of message is based on a WCI-2 message type.

8. The method of claim 1, wherein the second coexistence information indicates whether a transmitter of one of the two or more radios is active.

9. The method of claim 1, wherein the second coexistence information indicates whether a shared low-noise amplifier is in a bypass mode or a high-gain mode, wherein the shared low-noise amplifier is shared by the first radio access technologies and the second radio access technologies.

10. The method of claim 1, wherein the second coexistence information comprises gain settings for a shared low-noise amplifier, wherein the shared low-noise amplifier is shared by the first radio access technologies and the second radio access technologies.

11. The method of claim 10, wherein the second coexistence information is used to configure gain settings for components of an automatic gain control circuit that receives an output of the shared low-noise amplifier.

12. The method of claim 10, wherein the second coexistence information is used to configure gain settings for a quadrature low-noise amplifier that receives an output of the shared low-noise amplifier.

13. An apparatus, comprising:
a first radio configured to communicate through a shared antenna over a first network operated in accordance with 5 GHz Wireless Local Area Network (WLAN) protocols;
a second radio configured to communicate through the shared antenna over a second network operated in accordance with fourth generation Long-Term Evolution License Assisted Access (LTE-LAA) protocols using a licensed band of frequencies and an unlicensed 5 GHz band of frequencies; and
a coexistence link configured to carry Wireless Coexistence Interface-2 (WCI-2) messages between the first radio and the second radio, wherein the first radio is configured to transmit coexistence information over the coexistence link to the second radio through reuse of coexistence signals in a WCI-2 Type-0 message to carry coexistence signals related to a WLAN-5 GHz radio access technology.

14. The apparatus of claim 13, and further comprising:
a splitter configured to provide signals derived from a radio frequency signal received by the shared antenna to a receiver in each of the first radio and the second radio.

15. The apparatus of claim 13, wherein the first radio is configured to:
transmit a WCI-2 message indicating that the second coexistence information relates to the WLAN-5 GHz radio access technology.

16. The apparatus of claim 13, wherein one or more coexistence signals in the WCI-2 Type-0 message related to a Bluetooth radio access technology or a 2.4 GHz WLAN radio access technology are reused to serve as coexistence signals related to the WLAN-5 GHz radio access technology.

17. The apparatus of claim 13, wherein the coexistence information indicates whether a transmitter of the first radio is active.

18. The apparatus of claim 13, wherein the coexistence information indicates whether a shared low-noise amplifier is in a bypass mode or a high-gain mode, wherein the shared low-noise amplifier is shared by the first radio and the second radio.

19. The apparatus of claim 13, wherein the coexistence information comprises gain settings for a shared low-noise amplifier, wherein the shared low-noise amplifier is shared by the first radio and the second radio.

20. The apparatus of claim 19, wherein the shared low-noise amplifier is provided external to the first radio and the second radio, and wherein the shared low-noise amplifier is deployed between the shared antenna and a splitter configured to provide signals derived from a radio frequency signal received by the shared antenna to a receiver in each of the first radio and the second radio.

21. The apparatus of claim 19, wherein the shared low-noise amplifier is deployed within the first radio or the second radio.

22. The apparatus of claim 19, wherein the coexistence information is used to configure gain settings for components of an automatic gain control circuit that receives an output of the shared low-noise amplifier.

23. The apparatus of claim 19, wherein the coexistence information is used to configure gain settings for a quadrature low-noise amplifier that receives an output of the shared low-noise amplifier.

24. A processor-readable storage medium having instructions stored thereon which, when executed by at least one processor or state machine of a processing circuit, cause the processing circuit to:
transmit first coexistence information between two or more devices using a first type of message configured to carry one or more bits that serve as a first virtual coexistence signal related to first radio access technologies operable in a first band of frequencies; and
transmit second coexistence information between two or more radios using the first type of message by repurposing the first type of message to carry one or more bits that serve as a second virtual coexistence signal related to second radio access technologies operable in a second band of frequencies outside the first band of frequencies in which the first radio access technologies are operable.

25. The processor-readable storage medium of claim 24, wherein a receiver in each of the two or more radios is coupled to a common antenna through a splitter.

26. The processor-readable storage medium of claim 24, and further comprising:
transmit a second type of message indicating that the second coexistence information relates to at least one of the second radio access technologies.

27. The processor-readable storage medium of claim 26, wherein the first radio access technologies include Bluetooth and Wireless Local Area Network (WLAN) radio access technologies and the first radio access technologies are operable at 2.4 GHz.

28. The processor-readable storage medium of claim 26, wherein the second radio access technologies include fourth generation Long-Term Evolution License Assisted Access (LTE-LAA) and WLAN-5 GHz radio access technologies and the second radio access technologies are operable at 5 GHz.

29. The processor-readable storage medium of claim 26, wherein the first type of message is a Wireless Coexistence Interface-2 (WCI-2) Type-0 message.

30. The processor-readable storage medium of claim 29, wherein the second type of message is a WCI-2 message type.

* * * * *